2 Sheets—Sheet 1.

H. B. COOLEY, J. M. NOBLE & J. E. TREVOR.

PAPER FEEDING MACHINE.

No. 11,474. Reissued Feb. 26, 1895.

Witnesses:
J. B. McGirr.
A. R. Appleman

Inventors.
H. B. Cooley
J. M. Noble
J. E. Trevor.
By Howson & Howson,
their Attys.

2 Sheets—Sheet 2.

H. B. COOLEY, J. M. NOBLE & J. E. TREVOR.

PAPER FEEDING MACHINE.

No. 11,474. Reissued Feb. 26, 1895.

Witnesses:

J. B. McGirr.

A. R. Appleman

Inventors:

H. B. Cooley,
J. M. Noble,
J. E. Trevor,
By
Howson & Howson
Their Attys.

UNITED STATES PATENT OFFICE.

HENRY BUCKLEY COOLEY, JOHN MADISON NOBLE, AND JAMES EDWARD TREVOR, OF HARTFORD, CONNECTICUT.

PAPER-FEEDING MACHINE.

SPECIFICATION forming part of Reissued Letters Patent No. 11,474, dated February 26, 1895.

Original No. 530,828, dated December 4, 1894. Application for reissue filed January 26, 1895. Serial No. 536,488.

*To all whom it may concern:*

Be it known that we, HENRY BUCKLEY COOLEY and JOHN MADISON NOBLE, citizens of the United States, and JAMES EDWARD TREVOR, a subject of the Queen of Great Britain and Ireland, residing at Hartford, in the county of Hartford and State of Connecticut, have invented certain new and useful Improvements in Paper-Feed Devices, of which the following is a specification.

Our invention relates to paper feeding devices and more particularly to that class of such devices in which suction is used to initially separate the successive sheets from the pile of paper for the feeding mechanism proper.

Our objects are to increase the output of such devices by increasing the speed at which they may be operated and by making the feeding continuous, avoiding the necessity of stopping the device to replenish the pile, as is now generally the case; to construct a machine with fewer parts than is now found in these devices, thereby reducing the first cost and the cost of repairs, while securing a more simple and effective mechanism for the purpose desired. These and other objects we attain by the mechanism hereinafter described and claimed, with reference to the accompanying drawings forming a part of the specification.

Figure 1:
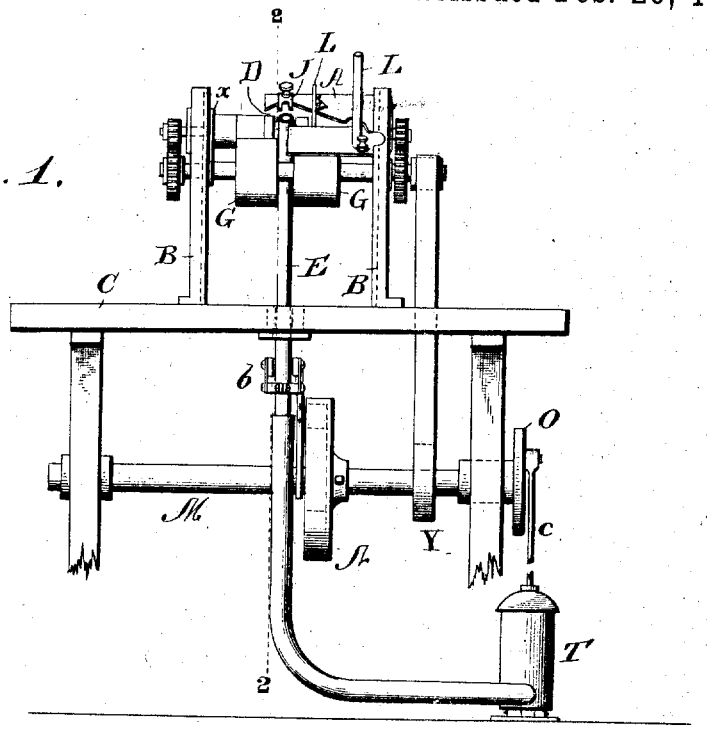
Figure 2:
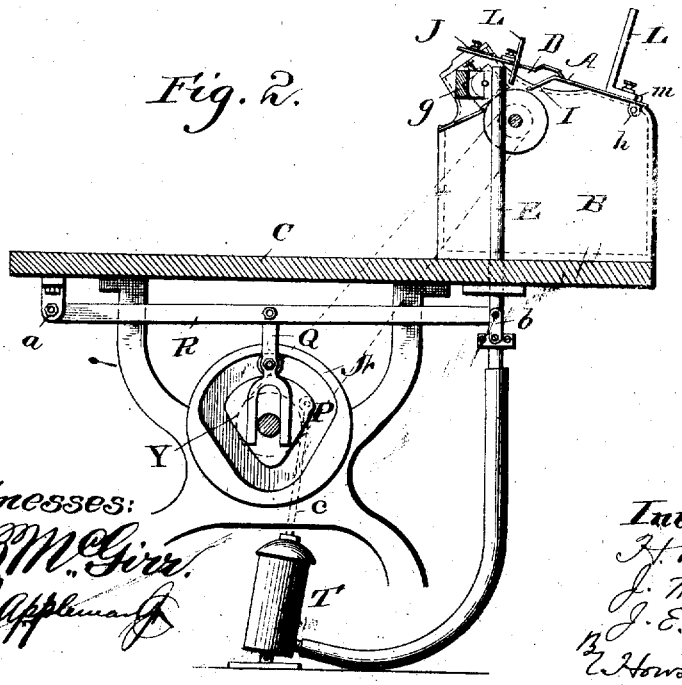
Figure 3:
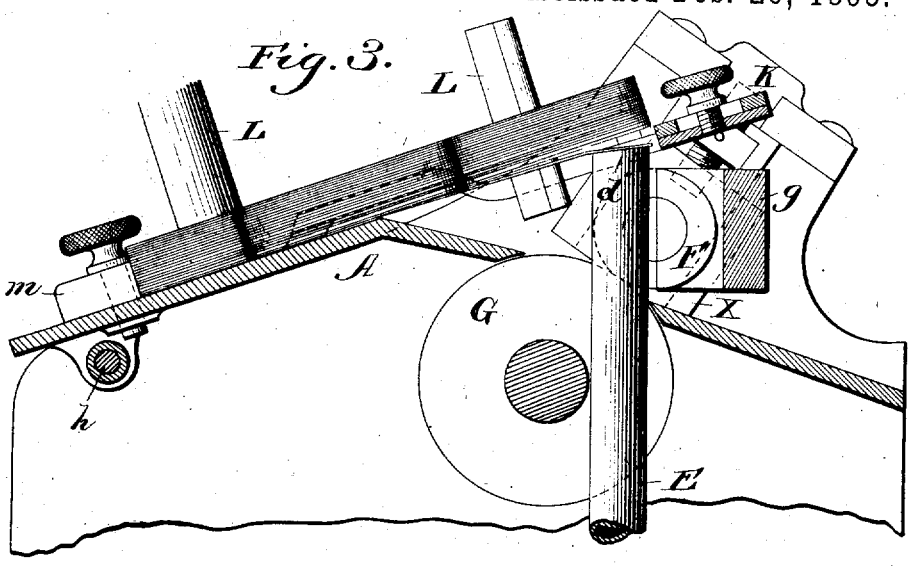
Figure 4:
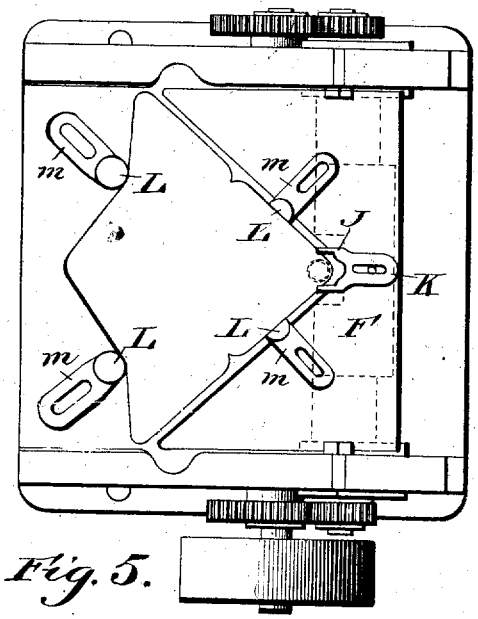
Figure 5:
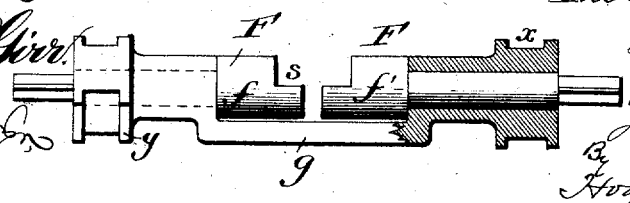

In the drawings: Figure 1 is a rear elevation of the device embodying our invention, with a part broken away. Fig. 2 is a vertical sectional view thereof on the line 2—2, Fig. 1, looking to the right. Fig. 3 is a similar view on the same line looking to the left. Fig. 4 is a top plan view. Fig. 5 is a detail of the upper feed roll.

The same reference letters indicate corresponding parts throughout the several views.

The letter, A, designates a table which is supported upon the side frames, B, suitably secured to the bed, C. This table is preferably inclined, as shown, so that the pile of paper which rests thereon will have its front end so disposed over the aperture, or opening, D, in the table that the front end of the bottom sheet may be readily drawn away from the pile by the suction pipe, E, which reciprocates across the line of centers of the two feed rolls, F, G, journaled in suitable bearings in the frames, B, as hereinafter more fully described.

The table, A, may be secured to the frames in any suitable manner, as, for example, by bolts, *h*, passing through the said frames and lugs upon the under side of the table; and the opening or aperture, D, in the table may be formed by cutting away a portion, I, and bending the same downward tangent to the feed rolls, making a guiding surface or apron for the paper as it is drawn through the feeding rolls. At the front end of the table is a separator, J, preferably in the form of a metal fork with its slotted end, K, adjustably secured to said table by a set screw, and its fork projecting over the opening in the table, furnishing a support for the front end of the pile.

L, designates guide posts of suitable shape in cross section, provided with slotted projections, *m*, adjustably secured to the table by set screws. The front set, it will be seen, extends downwardly through the opening, keeping the sheet in proper alignment as it is drawn downward by the suction pipe.

Journaled in suitable bearings in the standards supporting the bed of the machine is a shaft, M, carrying the disk, N, which is provided with a cam groove, P, in which travels a roller on one end of the link, Q, having its other end connected to the lever, R, fulcrumed at *a*, to the bed or frame of the device, and pivotally connected by a double link, *b*, to the suction pipe, E. This pipe connects with the pump, T, which is operated from the shaft, M, by any suitable connections, such as the crank disk, O, and rod, *c*.

The pump shown is reciprocating, but it will be understood that any suitable air exhausting mechanism may be employed; and the pipe must of course be so connected therewith as to allow it to freely reciprocate to and from the bottom of the pile.

Referring more particularly to the construction of the feed rolls and their relation to the suction pipe, it will be seen in Fig. 5, that the upper roll, F, consists of two parts, *f* and *f'*, having a space between them sufficient for the passage of the pipe, E, journaled in suitable boxes, *x* and *y*, mounted in the side frames, and connected by a web, *g*. This roll is recessed, as shown at *s*, to allow free passage of the blank or sheet therethrough, and is placed diagonally above the lower roll, G, so that the axes of the two rolls may be in different vertical planes for the purpose of having the path of motion of the pipe E, across the line of centers of the rolls. By this arrangement of the rolls, the suction pipe will present the front end of the blank or sheet, in its descent, fairly upon the roll, G, when the said sheet comes tangent to this lower roll. The lower roll, G, is also made in two parts, as shown in Fig. 1, to allow the suction pipe, E, to pass between the rolls. The edge of the recess in the upper roll forms the "grab" which in the operation of the device follows closely upon the receding pipe, and grips firmly the edge of the sheet to strip it from the pipe as the latter brings the said sheet tangent to the lower roll.

The cam groove in the disk, N, is preferably formed with a rest for a third of revolution at the top and bottom and a rise and fall of one sixth each on the side so that the pipe in its extreme upper position will dwell a sufficient time to allow the suction to act upon the paper when the pile is slightly raised by the said pipe as it comes in contact therewith; while a similar rest is provided in the extreme lower position to allow the feeding rolls to pass the sheet which has been stripped from the pipe by the said rolls in the downward movement. The feeding rolls are so timed that they complete two or more revolutions while the suction pipe makes one reciprocation, thus securing an effective feeding for each sheet or blank.

To insure the better action of the suction upon the sheet, we make the pipe, E, inclined, by cutting the said pipe away, at an angle less than the angle of repose of the pile, as shown at *d*, so that the heel of the pipe acts to slightly raise the pile from its support while the suction effectively separates the front end of the sheet from the pile, drawing the said front end through the forked separator.

The feed rolls may be driven from the shaft, M, by any suitable gearing, as by a belt running from the pulley, Y, or they may be operated from any suitable part of the machine to which our feeding device may be attached.

While we have shown our device adapted for envelope machines, it is obvious that it may be applied to any machines in which paper or other flexible material is to be fed in successive sheets or blankets; and the form of the table, the shape and number of guides, may be varied to suit different requirements without departing from our invention; while the means for effecting a reciprocation of the suction pipe is subject to the same conditions, though we have shown what we deem now to be the preferable means for attaining this result.

From the foregoing description it will now be clear that as the heel of the pipe, E, comes in contact with and slightly raises the pile, the suction which has been previously established by the operation of the air pump will quickly draw the front end of the bottom sheet away from the pile which closes the end of the pipe and prevents further action upon the pile, the forked separator now intervening to thus keep the rest of the pile intact; and as the pipe descends, the upper feed roll will grip the sheet when it becomes tangent to the lower roll, thus stripping it from the pipe, and acting with the lower roll, the sheet will be drawn through and fed to the point desired. Meantime the pipe will have reached the extreme lower position and will dwell there until the said sheet has passed through the rolls, when the operation will be repeated.

By feeding from the bottom of the pile, the operation may be continuous, since the pile may be constantly replenished without stopping the machine, which would otherwise be necessary if fed from the top; and furthermore, the pressure of the sheets above the one upon which the suction acts is utilized to keep the same rigid and prevents the tendency to displacement of the sheets, whereby all sheets are kept in alignment as presented to the feed rolls, while the work of the suction pipe is decreased. It will also be observed that in making the path of motion of the suction pipe across the line of centers of the feed rolls, we are enabled to dispense with the intervening mechanism usually employed for carrying the sheet after separation from the pile to the feed rolls, while the presentation of the sheet by the pipe directly upon the surface of the feed rolls secures a simple rotary feed for the sheets, without any reciprocating motion whatever.

A device made in accordance with our invention possesses many advantages over existing devices of the kind, and among these advantages we may state that it has fewer parts, contributing to simplicity of structure and operation, and consequent decrease in cost and expense of running and repairs.

To replenish the pile it is not necessary to stop the mechanism thus rendering the operation continuous and the speed at which it may be run is materially greater while the whole results in a greatly increased output.

What we claim is—

1. A paper feeding device consisting of a table for supporting the pile of paper, feeding rolls journaled in bearings below said table, the upper roll recessed for the passage of the paper therethrough, and a reciprocating suction pipe passing between said rolls and adapted to separate the bottom sheet of the pile, and carry the same to the feeding rolls, and means for creating suction in said pipe, substantially as described.

2. In a paper feed device, the combination with the inclined table for supporting a pile of paper flat upon the surface thereof, of the reciprocating suction pipe, the air pump, the feeding rolls journaled in bearings below said table, the upper roll recessed for the passage of the paper therethrough, the edge of the recess adapted to "grip" the sheet and strip it from the pipe as the said pipe descends, substantially as described.

3. In a paper feed device the combination with the inclined table for supporting a pile of blanks, the feed rolls journaled in bearings on different vertical planes below the table, the upper roll recessed for the passage of the blanks, the suction pipe having its path of motion across the line of centers of said rolls, a shaft journaled below the table, connections between said shaft and pipe for reciprocating the same, substantially as described.

4. In a paper feed device, the combination with the inclined table supporting the pile, the feed rolls journaled in bearings below the same, the upper roll recessed for the passage of the blanks, with the suction pipe and means for reciprocating said pipe once while the feed rolls make two or more revolutions, substantially as described.

5. In a paper feed device, the combination with the apertured table, for supporting a pile of blanks, with the separator at the front end thereof, of feed rolls journaled in bearings below the table, the upper roll recessed for the passage of the blanks, the vertically moving suction pipe, the rotating shaft below the table provided with a cam controlling the movements of said pipe, whereby the pipe is brought in contact with the bottom sheet of the pile resting over the aperture in the table, substantially as described.

6. In a paper feed device, the combination with the table for supporting the pile of paper, of the feed rolls rotating in bearings below the same, the upper roll recessed for the passage of the paper, the suction pipe, the rotating shaft carrying a disk having a cam groove in its surface, a lever fulcrumed at one end to a fixed part of the device, and pivotally connected by links to said pipe at its other end, and a link attached to said lever with one end engaging the said cam groove, whereby said pipe is caused to reciprocate between said rolls, substantially as described.

7. In a paper feed device, the combination with the apertured table for supporting the pile, provided with guides for said pile, one set of which projects through the aperture to guide the paper passing there-through, the reciprocating suction pipe, and the feed rolls journaled in bearings below the table, adapted to strip the sheet from said pipe in its descent, substantially as described.

8. A paper feed device consisting of an inclined apertured table supporting a pile of blanks flatly upon the same and over the apertures, a separator projecting over the aperture and supporting the end of the pile, a reciprocating suction pipe adapted to pass by the separator and raise the pile in its ascent and successively detach therefrom the bottom blank as it descends, with feeding rolls journaled below the table, the upper one recessed for the passage of the blanks, substantially as described.

In testimony whereof we have signed our names to this specification in the presence of two subscribing witnesses.

HENRY BUCKLEY COOLEY.
JOHN MADISON NOBLE.
JAMES EDWARD TREVOR.

Witnesses:
HENRY A. WOLCOTT,
JOHN DARBY.